US011126885B2

(12) United States Patent
Santra et al.

(10) Patent No.: US 11,126,885 B2
(45) Date of Patent: Sep. 21, 2021

(54) CHARACTER RECOGNITION IN AIR-WRITING BASED ON NETWORK OF RADARS

(71) Applicant: Infineon Technologies AG, Neubiberg (DE)

(72) Inventors: Avik Santra, Munich (DE); Muhammad Arsalan, Munich (DE)

(73) Assignee: Infineon Technologies AG, Neubiberg (DE)

( * ) Notice: Subject to any disclaimer, the term of this patent is extended or adjusted under 35 U.S.C. 154(b) by 271 days.

(21) Appl. No.: 16/360,284

(22) Filed: Mar. 21, 2019

(65) Prior Publication Data

US 2020/0302210 A1    Sep. 24, 2020

(51) Int. Cl.
*G06K 9/00* (2006.01)
*G06K 9/46* (2006.01)
*G06K 9/62* (2006.01)

(52) U.S. Cl.
CPC ............. *G06K 9/46* (2013.01); *G06K 9/6262* (2013.01)

(58) Field of Classification Search
CPC .... G06K 9/46; G06K 9/6262; G06K 9/00355; G06F 3/017; G01S 7/415; G01S 13/87
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

A CNN Based Framework for Unistroke Numeral Recognition in Air-Writing (Year: 2018).*

(Continued)

*Primary Examiner* — Solomon G Bezuayehu
(74) *Attorney, Agent, or Firm* — Slater Matsil, LLP

(57) ABSTRACT

In an embodiment, a method for air-writing character recognition includes: determining a position of an object in a monitoring space using trilateration by using a plurality of millimeter-wave radars, where each millimeter-wave radar of the plurality of millimeter-wave radars has a field of view, and where an intersection of the fields of view of the plurality of millimeter-wave radars forms the monitoring space; tracking the position of the object in the monitoring space over time using the plurality of millimeter-wave radars; determining a character symbol depicted by the tracked position of the object over time using a neural network (NN); and providing a signal based on the determined character symbol.

23 Claims, 9 Drawing Sheets

(56) References Cited

U.S. PATENT DOCUMENTS

| | | |
|---|---|---|
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,504,920 B2* | 11/2016 | Kareemi .............. A63F 13/22 |
| 9,886,095 B2 | 2/2018 | Pothier |
| 9,935,065 B1 | 4/2018 | Baheti et al. |
| 10,055,660 B1* | 8/2018 | Mahmoud .............. G06T 7/11 |
| 10,386,481 B1* | 8/2019 | Chen .................. G01S 15/58 |
| 10,591,998 B2* | 3/2020 | Masuko .............. G06F 40/274 |
| 10,739,864 B2* | 8/2020 | Scott, II .............. G06F 3/017 |
| 10,877,568 B2* | 12/2020 | Huang .............. G06K 9/00355 |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2010/0313150 A1* | 12/2010 | Morris .................. G06F 9/452 |
| | | 715/761 |
| 2011/0181509 A1 | 7/2011 | Rautiainen et al. |
| 2011/0254765 A1* | 10/2011 | Brand .................. G06F 3/017 |
| | | 345/158 |
| 2011/0299433 A1 | 12/2011 | Darabi et al. |
| 2012/0087230 A1 | 4/2012 | Guo et al. |
| 2012/0092284 A1* | 4/2012 | Rofougaran .......... H04M 1/725 |
| | | 345/173 |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2012/0313900 A1* | 12/2012 | Dahl ...................... G06F 3/043 |
| | | 345/177 |
| 2012/0326995 A1* | 12/2012 | Zhang .................. G06F 3/0425 |
| | | 345/173 |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1* | 9/2016 | Molchanov .......... G06K 9/00355 |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar et al. |
| 2016/0334502 A1 | 11/2016 | Ali et al. |
| 2016/0349845 A1 | 12/2016 | Poupyrev et al. |
| 2016/0378195 A1* | 12/2016 | Lefebvre ............ G06K 9/00879 |
| | | 382/156 |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2018/0157330 A1* | 6/2018 | Gu ........................ G06F 3/017 |
| 2019/0311227 A1* | 10/2019 | Kriegman .......... G06K 9/00442 |
| 2020/0026361 A1* | 1/2020 | Baheti .................. G06F 3/017 |
| 2020/0082196 A1* | 3/2020 | Georgis .............. G06K 9/6256 |
| 2020/0150771 A1* | 5/2020 | Giusti .................. G06F 3/017 |
| 2020/0201443 A1* | 6/2020 | Huang ................ G06F 21/31 |
| 2020/0234030 A1* | 7/2020 | Baheti .................. B60R 25/252 |
| 2020/0250413 A1* | 8/2020 | Lu ........................ G06N 3/0436 |
| 2020/0293613 A1* | 9/2020 | Ramachandra Iyer ................... |
| | | G06K 9/6271 |
| 2021/0033693 A1* | 2/2021 | Chen .................. G06K 9/00429 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |

(56) References Cited

FOREIGN PATENT DOCUMENTS

| | | | |
|---|---|---|---|
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Fingertip Detection and Tracking for Recognition of Air-Writing in Videos (Year: 2018).*

Finger-Writing-In-The-Air System Using Kinect Sensor (Year: 2021).*

Norrdine, A., "An Algebraic Solution to the Multilateration Problem", 2012 International Conference on Indoor Positioning and Indoor Navigation, Nov. 13-15, 2012, 5 pages.

Agarwal, C. et al., "Segmentation and Recognition of Text Written in 3D using Leap Motion Interface", 2015 3rd IAPR Asian Conferecne on Pattern Recognition, Nov. 1, 2015, 5 pages.

Amma, C. et al., "Airwriting: Hands-free Mobile Text Input by Spotting and Continuous Recognition of 3d-Space Handwriting with Inertial Sensors", 2012 16th International Symposium on Wearable Computers, Jun. 18-22, 2012, 8 pages.

Moazen, D. et al., "AirDraw: Leveraging Smart Watch Motion Sensors for Mobile Human Computer Interactions", 2016 31th IEEE Annual Consumer Communications & Networking Conference (CCNC), Jan. 9-12, 2016, 5 pages.

Zhang, J. et al., "Deformable Deep Convolutional Generative Adversarial Network in Microwave Based Hand Gestrue Recognition System", College of Information Science & Electronic Engineering, Mar. 4, 2019, 6 pages.

Ikram, M.Z. et al., "High-Accuracy Distance Measurement Using Millimeter-Wave Radar", Texas Instruments Incorporated, Nov. 29, 2017, 5 pages.

Molchanov, P. et al., "Short-Range FMCW Monopulse Radar for Hand-Gesture Sensing", May 10-15, 2015, 6 pages.

Roy, P. et al., "A CNN Based Framework for Unistroke Numeral Recognition in Air-Writing", Computer Vision and Pattern Recognition Unit, Indian Statistical Institute, Feb. 23, 2019, 1 page.

Zhang, X. et al., "A New Writing Experience: Finger Writing in the Air Using a Kinect Sensor", Multimedia at Work, University of Missouri, Jul. 2013, 9 pages.

Zhang, J. et al., "Doppler-Radar Based Hand Festrue Recognition System Using Convolutional Neural Networks", College of Information Science & Electronic Engineering, arXiv:1711.02254v3 [cs.CV] Nov. 22, 2017, 8 pages.

Zhou, Z. et al., "Dynamic Gesture Recognition with a Terahertz Radar Based on Range Profile Sequences and Doppler Signatures", School of Electronic Engineering, University of Electronic Science and Technology of China, Sensors, Dec. 21, 2017, 15 pages.

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated Ka-Band TX Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

(56) References Cited

OTHER PUBLICATIONS

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW Sar," Hindawi Publishing Corporation, Mathematical Problems in Engineering, vol. 2014, Article ID 859890, http://dx.doi.org/10.1155/2014/859890, 11 pages.

Arsalan, Muhammad et al., "Character Recognition in Air-Writing Based on Network of Radars for Human-Machine Interface", IEEE Sensors Journal, vol. 19, No. 19, Oct. 1, 2019, 10 pages.

Chuang, Cheng-Ta et al., "Applying the Kalman Filter to the Infrared-Based Touchless Positioning System with Dynamic Adjustment of Measurement Noise Features", International Microsystems, Packaging Assembly and Circuits Technology Conference, Impact, IEEE Catalog No. CFP1459B-Art, ISBN 978-1-4799-7727-7, Oct. 22, 2014, 4 pages.

Hazra, Souvik et al., "Robust Genre Recognition Using Millimeter-Wave Radar System", IEEE Sensors Letters, vol. 2, No. 4, Dec. 2018, 4 pages.

Leem, Seong Kyu et al., "Detecting Mid-Air Gestures for Digit Writing with Radio Sensors and a CNN", IEEE Transactions on Instrumentation and Measurement, vol. 69, No. 4, Apr. 2020, 16 pages.

Molchanov, Pavlo et al., "Online Detection and Classification of Dynamic Hand Gestures with Recurrent 3D Convolutional Neural Networks", IEEE Conference on Computer Vision and Pattern Recognition, Jun. 27, 2016, 10 pages.

Wang, Saiwen et al., "Interacting with Soli: Exploring Fine-Grained Dynamic Gesture Recognition in the Radio-Frequency Spectrum", ACM, Tokyo, Japan, Oct. 16-19, 2016, 10 pages.

Yana, Buntueng et al., "Fusion Networks for Air-Writing Recognition", International Conference on Pervasive Computing, Springer, XP047460334, ISBN: 978-3-642-17318-9, Jan. 13, 2018, 11 pages.

* cited by examiner

CHARACTER RECOGNITION IN AIR-WRITING BASED ON NETWORK OF RADARS

TECHNICAL FIELD

The present invention relates generally to an electronic system and method, and, in particular embodiments, to character recognition in air-writing based on network of radars for human-machine interface.

BACKGROUND

Human-machine interfaces are used by humans to interact with machines. Conventional human-machine interfaces have been available for many years. Examples of conventional human-machine interfaces include input hardware, such as keyboards, mice, game pads, microphones, output hardware, such as computer monitors, printers, and speakers, and input/output hardware, such as touchscreens.

Human-machine interfaces may include several categories, such as command line interfaces (e.g., receiving an input via a keyboard and providing an output as text via a computer monitor), graphical user interfaces (e.g., receiving an input via a keyboard and a mouse and providing an output using graphics via a computer monitor), voice user interfaces (e.g., using a person's voice to control a device), and gesture interfaces (e.g., using a person's hand gesture captured via a video camera to control a device).

Human-machine interface may be used to facilitate interaction between humans. For example, a first human may interact with a second human by interacting with a first computer using a first human-machine interface that includes a microphone, a speaker, video camera and a computer monitor. The first computer transmits data associated with such interaction to a second computer. The second human interacts with the second computer using a second human-machine interface that includes a microphone, a speaker, a video camera, and a computer monitor.

SUMMARY

In accordance with an embodiment, a method for air-writing character recognition includes: determining a position of an object in a monitoring space using trilateration by using a plurality of millimeter-wave radars, where each millimeter-wave radar of the plurality of millimeter-wave radars has a field of view, and where an intersection of the fields of view of the plurality of millimeter-wave radars forms the monitoring space; tracking the position of the object in the monitoring space over time using the plurality of millimeter-wave radars; determining a character symbol depicted by the tracked position of the object over time using a neural network (NN); and providing a signal based on the determined character symbol.

In accordance with an embodiment, an air-writing character recognition system includes: a plurality of millimeter-wave radars, where each millimeter-wave radar of the plurality of millimeter-wave radars is configured to have a field of view, and where an intersection of the fields of view of the plurality of millimeter-wave radars forms a monitoring space; and a controller configured to: determine a position of an object in the monitoring space based on outputs of the plurality of millimeter-wave radars by using trilateration, track the position of the object in the monitoring space over time based on the determined position using the plurality of millimeter-wave radars, determine a character symbol depicted by the tracked position of the object over time using a neural network (NN), and provide a signal based on the determined character symbol.

In accordance with an embodiment, a millimeter-wave radar system includes: three millimeter-wave radars, each of the three millimeter-wave radars configured to have a field of view, where an intersection of the fields of view of each of the three millimeter-wave radars forms a monitoring space; and a controller configured to: determine a position of an object in the monitoring space based on output of the three millimeter-wave radars by using trilateration, determine a trajectory of the object over time based on the determined position of the object, apply a filter to the determined trajectory to generate a filtered trajectory, determine a character symbol depicted by the filtered trajectory using a long-short term memory (LSTM), and provide a signal based on the determined character symbol.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 shows a schematic diagram of the network of millimeter-wave radars of

FIG. 6, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
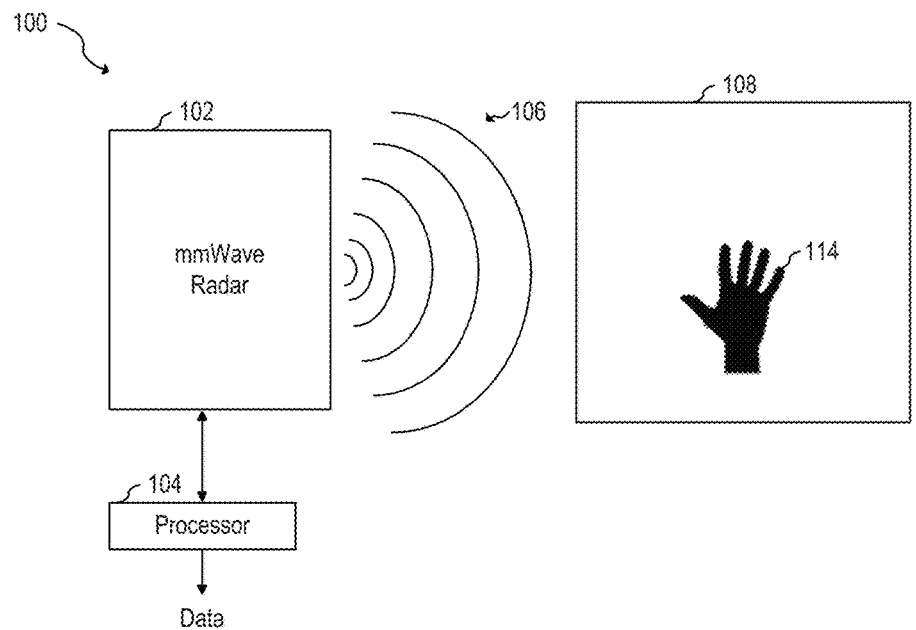
FIG. 1 shows a schematic diagram of a millimeter-wave (mmWave) radar system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a system and method of character recognition in air-writing based on network of millimeter-wave radars for human-machine interface. Embodiments of the present invention may be implemented with other types of radars (e.g., other than millimeter-wave radars) and may be used for other applications, such as for machine-machine interface, for example. Although embodiments are illustrated with respect to Latin character symbols and numerical symbols, it is understood that other types of symbols, such as non-Latin characters (e.g., kanji symbols, Hebrew characters, Urdu characters, and sign language gestures) may also be used.

In an embodiment of the present invention, an air-writing system that includes a network of millimeter-wave radars uses a two-stage approach for extraction and recognition of handwriting gestures. The extraction processing stage uses fine range estimates combined with trilateration technique to detect and localize the hand of a user, followed by Kalman filter or any smoothing filter to create a smooth trajectory of the hand gesture movement. The recognition stage classifies characters drawn by the user by using a long short term memory (LSTM) such as a bi-directional LSTM (BiLSTM) that is fed with consecutive Kalman filter states along the gesture trajectory.

Conventional hand gesture recognition systems may be based on camera modules that use computer vision techniques and optical sensors. Camera based recognition systems generally use substantial computational power processing graphic images that are illuminated with proper illumination and that include at least portions of a human. Hand-gesture recognition systems may also be implemented using light and time-of-flight (ToF) technology.

Advantages of some embodiments include accurately detecting character symbols handwritten with hand gestures without processing graphic images without being impacted by illumination changes of the hand performing the gesture. Some embodiments, therefore, are less computationally costly than conventional camera based systems as well as avoid privacy issues associated with graphic images of humans. Some embodiments advantageously determine character symbols from hand gestures without using wearables that aid in hand gesture recognition. Using millimeter-wave radars instead of conventional ToF technology advantageously allows for using estimates of Doppler shifts to accurately determine the trajectory of the hand.

In an embodiment, motion gesture sensing is performed wirelessly by a network of millimeter-wave radars. Trilateration is used to accurately localize the hand in three-dimensional coordinates. A Kalman filter or any smoothing filter is used to track and smooth the trajectory of the hand in motion. A bi-directional LSTM generates the text representation from the hand motion sensor data received from the Kalman filter.

FIG. 1 shows a schematic diagram of millimeter-wave radar system 100, according to an embodiment of the present invention. During normal operation, millimeter-wave radar 102 transmits a plurality of radiation pulses 106, such as chirps, towards scene 108. In some embodiments the chirps are linear chirps (i.e., the instantaneous frequency of the chirp varies linearly with time).

The transmitted radiation pulses 106 are reflected by objects (also referred to as targets) in scene 108. The reflected radiation pulses (not shown in FIG. 1), which are also referred to as the echo signal, are detected by millimeter-wave radar 102 and processed by processor 104 to, for example, determine the angle of arrival of the echo signal.

The objects in scene 108 may include, for example, hand 114 of a human. Scene 108 may include other objects, such as a finger of a hand, a metallic marker, and other objects.

Processor 104 analyses the echo data to determine the location of, e.g., hand 114 using signal processing techniques. For example, in some embodiments, a range FFT is used for estimating the range component of the location of a tip of an index finger of hand 114 (i.e., the distance of the tip of the index finger of hand 114 from the millimeter-wave radar). The azimuth component of the location of the detected human may be determined using angle estimation techniques.

Processor 104 may be implemented as a general purpose processor, controller or digital signal processor (DSP) that includes, for example, combinatorial circuits coupled to a memory. In some embodiments, the DSP may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. For example, some embodiments may be implemented as a combination of hardware accelerator and software running on a DSP or general purpose micro-controller.

Millimeter-wave radar 102 operates as a frequency-modulated continuous-wave (FMCW) radar that includes a millimeter-wave radar sensor circuit, a transmitting antenna, and a receiving antenna. Millimeter-wave radar 102 transmits and receives signals in the 20 GHz to 122 GHz range. Alternatively, frequencies outside of this range, such as frequencies between 1 GHz and 20 GHz, or frequencies between 122 GHz and 300 GHz, may also be used.

In some embodiments, the echo signals received by the receiving antenna of millimeter-wave radar 102 are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Figure 2:
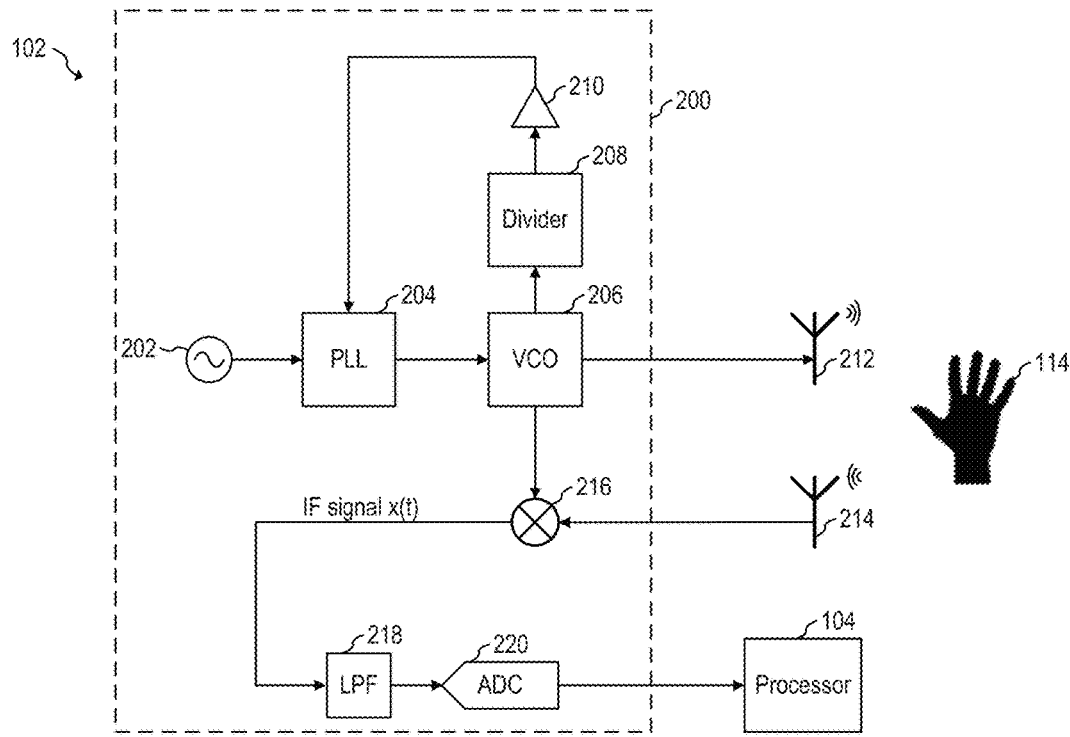
FIG. 2 shows a schematic diagram of the millimeter-wave radar of FIG. 1, according to an embodiment of the present invention.

FIG. 2 shows a schematic diagram of millimeter-wave radar 102, according to an embodiment of the present invention. Millimeter-wave radar 102 includes millimeter-wave radar sensor circuit 200, transmitting antenna 212, and receiving antenna 214. Millimeter-wave radar sensor circuit include phased-locked-loop (PLL) 2104, voltage controlled oscillator (VCO) 206, divider 208, amplifier 210, mixer 216, low-pass filter (LPF) 218, and ADC 220.

During normal operation, VCO 206 generates a linear frequency chirp (e.g., from 57 GHz to 64 GHz) that is transmitted by transmitting antenna 212. The VCO is controlled by PLL 204, which receives a reference clock signal (e.g., 80 MHz) from reference oscillator 202. PLL 204 is controlled by a loop that includes divider 208 and amplifier 210.

The linear chirp transmitted by transmitting antenna 212 is reflected by hand 114 and received by receiving antenna 214. The echo received by transmitting antenna 214 is mixed with the signal transmitted by transmitting antenna 212 using mixer 216 to produce an intermediate frequency (IF) signal x(t) (also known as the beat signal). The beat signal x(t) is filtered with low-pass filtered by LPF 218 and then sampled by ADC 220. ADC 220 is advantageously capable of sampling the beat signal x(t) with a sampling frequency that is much smaller than the frequency of signal received by receiving antenna 214. Using FMCW radars, therefore, advantageously allows for a compact and low cost implementation of ADC 220, in some embodiments.

The propagation delay between the signal transmitted by transmitting antenna 212 and receiving antenna 214 may be identified by determining the beat frequency of the beat signal x(t). The beat frequency of beat signal x(t) may be identified by using spectral analysis (e.g., by using FFT) using processor 104.

In an embodiment of the present invention, a millimeter-wave radar performs fine range estimation based on the frequency and phase of the beat signal.

The beat signal x(t) may be given by $$x(t) = Ae^{j(2\pi f_b t + \phi_b)} \quad (1)$$

where $f_b$ is the beat frequency and is the difference between the signal transmitted by transmitting antenna 212 and the signal received by receiving antenna 214.

The beat frequency may be given by $$f_b = \frac{2BR}{cT_c} \quad (2)$$

where B is the ramp bandwidth of the linear chirp transmitted by transmitting antenna 212, R is the range or distance to hand 114, c is the speed of light, and $T_c$ is the linear chirp duration.

Speed of light c is a known constant, and bandwidth B, and linear chirp duration $T_c$ are known quantities for a particular system. For example, in some embodiments, millimeter-wave radar 102 is characterized by having an elevation field-of-view (FoV) of 70°, an azimuth FoV of 70°, a ramp start frequency $f_{min}$ of 57 GHz, a ramp stop frequency $f_{max}$ of 63 GHz, a bandwidth B of 6 GHz ($f_{max}-f_{min}$), a chirp time $T_c$ of 171.2 µs, a sampling frequency $f_s$ of 0.747664 MHz, and a number of samples per chirp $N_s$ of 128. Since the beat frequency $f_b$ may be estimated, e.g., using spectral analysis of the beat signal x(t), and quantities B, c, and $T_c$ are known, range R may be estimated by using Equation 2.

The beat signal phase $\phi_b$ may be given by $$\phi_b = \frac{4\pi f_{min} R}{c} \quad (3)$$

Figure 3:
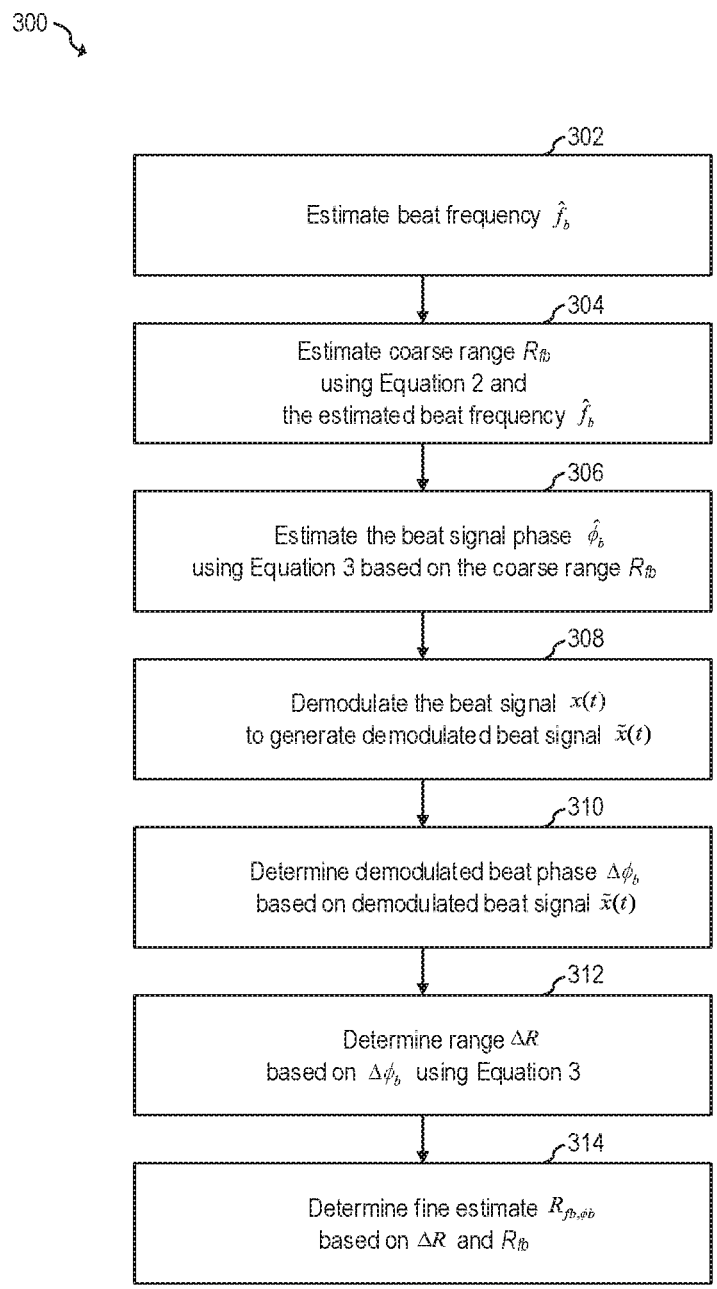
FIG. 3 shows a flowchart of an embodiment method of fine distance estimation, according to an embodiment of the present invention.

Since Equation 3 also includes range R, it is possible to improve range estimate by using Equations 2 and 3. For example, FIG. 3 shows a flowchart of embodiment method 300 of fine distance estimation, according to an embodiment of the present invention. Method 300 may be implemented, for example, by millimeter-wave radar 102.

During step 302, the beat frequency estimate $\hat{f}_b$ is estimated, e.g., using Equation 1 and a Fourier transform, such as an FFT. During step 304, a coarse range estimate $R_{fb}$ is estimated, e.g., using Equation 2 and the beat frequency estimate $\hat{f}_b$ estimated in step 302. During step 306, a beat signal phase estimate $\hat{\phi}_b$ is estimated, e.g., using Equation 3 and the coarse range estimate $R_{fb}$ estimated in step 304.

During step 308, the beat signal $\tilde{x}(t)$ is demodulated. The beat signal may be demodulated by $$\tilde{x}(t) = x(t) \cdot e^{-j(2\pi \hat{f}_b t + \hat{\phi}_b)} \quad (4)$$

where $\tilde{x}(t)$ is the demodulated signal. Substituting beat signal x(t) in Equation 4 with x(t) in Equation 1 results in $$\tilde{x}(t) = Ae^{j[2\pi(f_b - \hat{f}_b)t + (\phi_b - \hat{\phi}_b)]} \quad (5)$$

or $$\tilde{x}(t) = Ae^{j[2\pi(\Delta f_b)t + \Delta \phi_b]} \quad (6)$$

where $\Delta f_b = f_b - \hat{f}_b$ and $\Delta \phi_b = \phi_b - \hat{\phi}_b$.

When beat frequency $f_b$ has only a single component, the phase $\Delta \phi_b$ of demodulated signal $\tilde{x}(t)$ in Equation 6 is linear in time with a slope $\Delta f_b$ and a y-intersect $\Delta \phi_b$. During step 310, the demodulated beat phase $\Delta \phi_b$ is determined, e.g., using demodulated signal $\tilde{x}(t)$.

During step 312, range $\Delta R$ is determined, e.g., using Equation 3. For example, $\Delta R$ may be determined by $$\Delta R = \frac{c \Delta \phi_b}{4\pi f_{min}} \quad (7)$$

During step 314, fine estimate range $R_{fb,\phi b}$ is determined based on $\Delta R$. For example, fine estimate range $R_{fb,\phi b}$ may be determined by $$R_{fb,\phi b} = R_{fb} + \Delta R \qquad (8)$$

In an embodiment of the present invention, three millimeter-wave radars form a network of millimeter-wave radars. Each of the three millimeter-wave radar have a respective FoV directed to a monitoring space. When an object, such as hand 114 enters the monitoring space, each of the three millimeter-wave radars performs a fine range estimate to determine the range of hand 114 with respect to the respective millimeter-wave radar. A trilateration technique based on the fine range estimates from each of the three millimeter-wave radars is used to determine the location of hand 114 in the monitoring spaces.

In some embodiments, the network of radars is non-coherent and each of the millimeter-wave radars operates independently from each other when monitoring the same target. Processing for localizing the target (e.g., a finger) in the monitoring space (e.g., a finger) using data from the network of radars may be performed centrally (e.g., using a central processor) or distributed (e.g., using a plurality of processors, such as the processors of the millimeter-wave radars of the network of radars).

Figure 4:
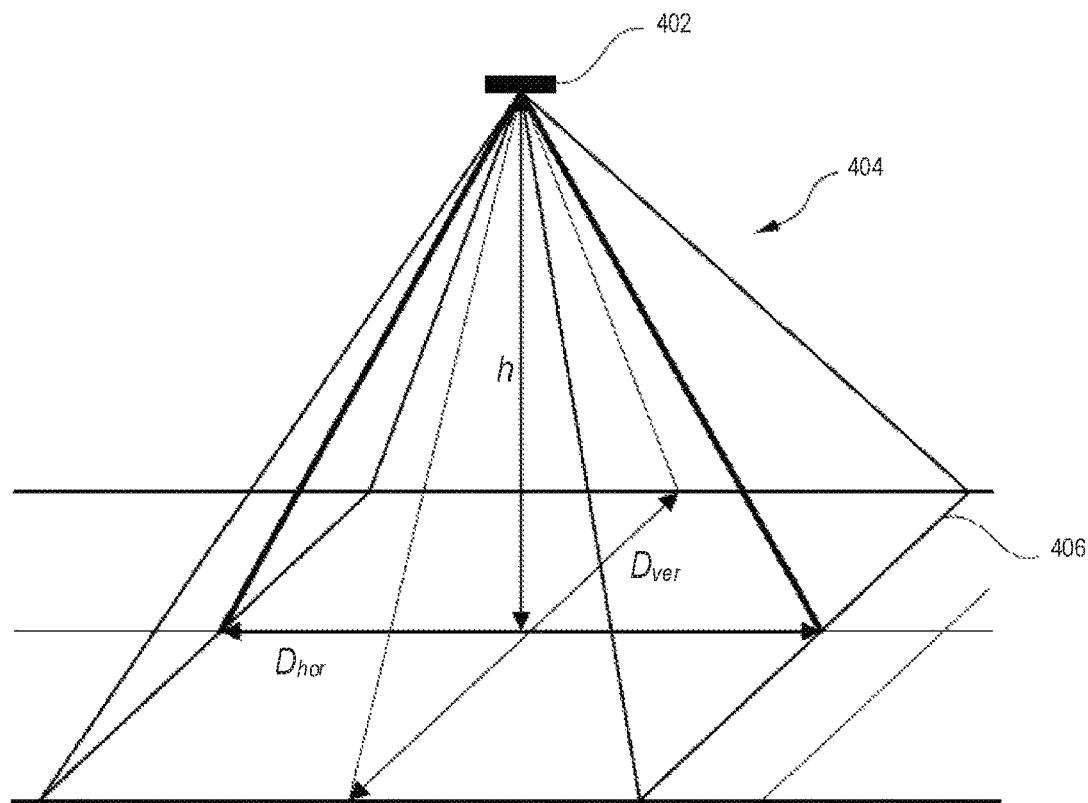
FIG. 4 shows a millimeter-wave radar having a field-of-view (FoV), according to an embodiment of the present invention.

FIG. 4 shows millimeter-wave radar 402 having FoV 404, according to an embodiment of the present invention. Millimeter-wave radar 402 may be implemented in a similar manner as millimeter-wave radar 102. FoV 404 is based on elevation FoV $\theta_{ver}$, and azimuth FoV $\theta_{hor}$. Vertical distance $D_{ver}$ may be given by $$D_{ver} = 2\left[h \cdot \tan\left(\frac{\theta_{ver}}{2}\right)\right]$$

and horizontal distance $D_{hor}$ may be given by $$D_{hor} = 2\left[h \cdot \tan\left(\frac{\theta_{hor}}{2}\right)\right],$$

where h is the distance between millimeter-wave radar 402 and plane 406, and where vertical distance $D_{ver}$ and horizontal distance $D_{hor}$ are in plane 406, as shown in FIG. 4.

Figure 5:
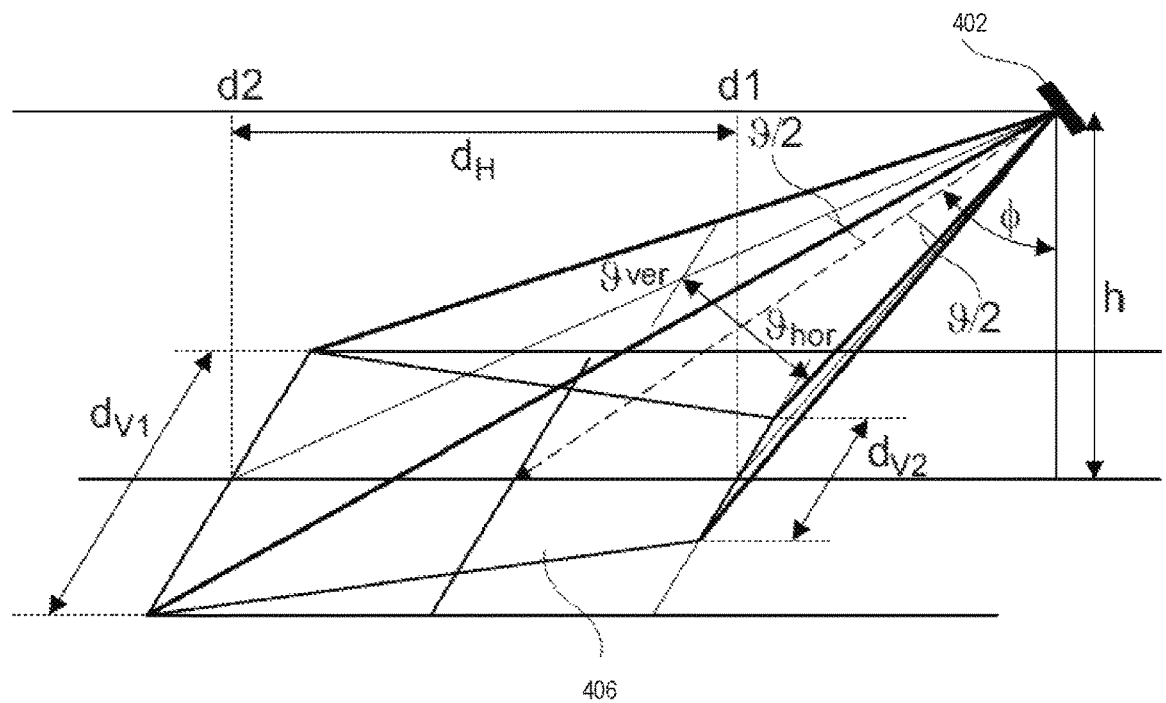
FIG. 5 shows a millimeter-wave radar having a FoV, according to an embodiment of the present invention.

The FoV of millimeter-wave radar 402 may be extended by steering the millimeter-wave radar by an angle $\phi$. For Example, FIG. 5 shows millimeter-wave radar 402 having FoV 504, according to an embodiment of the present invention. Distance $d_h$, $d_{v1}$ and $d_{v2}$ are in plane 406. Distance $d_h$ may be given by $$d_h = h \cdot \left[\tan\left(\frac{\theta_{ver}}{2} + \phi\right) + \tan\left(\frac{\theta_{ver}}{2} - \phi\right)\right],$$

distance $d_{v1}$ may be given $$d_{V1} = 2 \cdot \left[\frac{h}{\cos\left(\phi + \frac{\theta_{ver}}{2}\right)}\right] \cdot \tan\left(\frac{\theta_{ver}}{2}\right),$$

by and distance $d_{v2}$ may be given by $$d_{V2} = 2 \cdot \left[\frac{h}{\cos\left(\phi - \frac{\theta_{ver}}{2}\right)}\right] \cdot \tan\left(\frac{\theta_{ver}}{2}\right).$$

Figure 6:
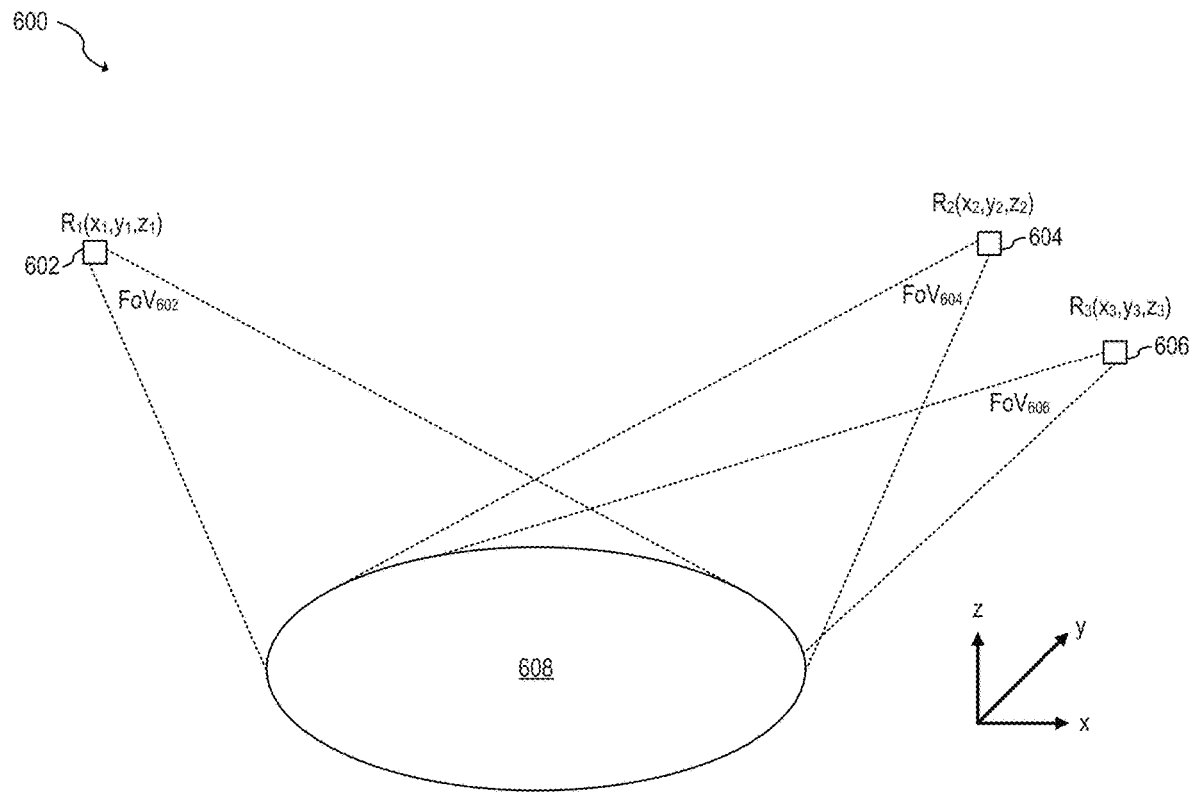
FIG. 6, shows a network of millimeter-wave radars and a corresponding monitoring space, according to an embodiment of the present invention.

FIG. 6, shows network of millimeter-wave radars 600 and corresponding monitoring space 608, according to an embodiment of the present invention. Network of millimeter-wave radars 600 includes millimeter-wave radars 602, 604, and 606. Each of millimeter-wave radars 602, 604, and 606 may be implemented in a similar manner as millimeter-wave radar 102 and may have a FoV based on steering or without using steering. Although network of millimeter-wave radars 600 shows only three millimeter-wave radars, it is understood that network of millimeter-wave radars 600 may include more than three millimeter-wave radars, such as four, five, six, or more.

As shown in FIG. 6, millimeter-wave radars 602, 604, and 606 are respectively located in points $R_1$, $R_2$, and $R_3$, having respective coordinates $(x_1,y_1,z_1)$, $(x_2,y_2,z_2)$, and $(x_3,y_3,z_3)$. In some embodiments, $R_1$, $R_2$, and $R_3$ do not lie in a straight line (i.e. are not situated in a straight line).

Monitoring space 608 is formed at an intersection of FoVs $FoV_{602}$, $FoV_{604}$, and $FoV_{606}$ of millimeter-wave radars 602, 604, and 606, respectively. In some embodiments, monitoring space 608 has a volume of about 10 cm³. In some embodiments, monitoring space 608 may have a volume higher than 10 cm³, such as 11 cm³, 13 cm³, 15 cm³ or more, or lower than 10 cm³, such as 9 cm³, 7 cm³ or less.

During normal operation, millimeter-wave radars 602, 604, and 606 monitor monitoring space 608. When an object, such as hand 114 or a finger of hand 114 enters monitoring space 608, millimeter-wave radars 602, 604, and 606 are used to determine the location of such object using trilateration.

When the object is located at point T(x,y,z), where point T(x,y,z) is located at distances $D_1$, $D_2$, and $D_3$ from millimeter-wave radars 602, 604, and 606, respectively, the coordinates of T may be obtained by $$\begin{cases} (x-x_1)^2 + (y-y_1)^2 + (z-z_1)^2 = D_1^2 \\ (x-x_2)^2 + (y-y_2)^2 + (z-z_2)^2 = D_2^2 \\ (x-x_3)^2 + (y-y_3)^2 + (z-z_3)^2 = D_3^2 \end{cases} \qquad (9)$$

which in matrix form is given by $$\begin{bmatrix} 1 & -2x_1 & -2y_1 & -2z_1 \\ 1 & -2x_2 & -2y_2 & -2z_2 \\ 1 & -2x_3 & -2y_3 & -2z_3 \end{bmatrix} \begin{bmatrix} x^2+y^2+z^2 \\ x \\ y \\ z \end{bmatrix} = \begin{bmatrix} D_1^2 - x_1^2 - y_1^2 - z_1^2 \\ D_2^2 - x_2^2 - y_2^2 - z_2^2 \\ D_3^2 - x_3^2 - y_3^2 - z_3^2 \end{bmatrix} \qquad (10)$$

which can be rewritten in the form $$A\underline{x} = \underline{b} \qquad (11)$$

where $\underline{x} \varepsilon$ E and where $E = \{(x_0,x_1,x_2,x_3)^T \varepsilon \ \Re^2 / x_0 = x_1^2 + x_2^2 + x_3^2\}$ When R1, R2, and R3 do not lie in a straight line, Range(A) is 3 and dim(K ern(A))=1, and the solution to Equation 11 may be given by $$\underline{x} = \underline{x}_p + \alpha \underline{x}_h \qquad (12)$$

where $\underline{x}_p$ is the particular solution of Equation 11, $\underline{x}_h$ is a solution of the homogenous system $A\underline{x}=0$ and $\alpha$ is a real parameter.

Real parameter a may be determined by using Equation 12 to generate Equation 13

$$\begin{cases} x_0 = x_{p0} + \alpha \cdot x_{h0} \\ x_1 = x_{p1} + \alpha \cdot x_{h1} \\ x_2 = x_{p2} + \alpha \cdot x_{h2} \\ x_3 = x_{p3} + \alpha \cdot x_{h3} \end{cases} \quad (13)$$

where $\underline{x}_p = (x_{p0}, x_{p1}, x_{p2}, x_{p3})^T$, $\underline{x}_h = (x_{h0}, x_{h1}, x_{h2}, x_{h3})^T$, and $\underline{x} = (x_0, x_1, x_2, x_3)^T$. Since $\underline{x} \in E$, then $$x_{p0} + \alpha \cdot x_{h0} = (x_{p1} + \alpha \cdot x_{h1})^2 + (x_{p2}{}^\circ \alpha \cdot x_{h2})^2 + (s_{p3} + \alpha \cdot x_{h3})^2 \quad (14)$$

and thus $$\alpha^2(x_{h1}{}^2 + x_{h2}{}^2 + x_{h3}{}^2 0 + \alpha(2 \cdot x_{p1} \cdot x_{h1} + 2 \cdot x_{p2} \cdot x_{h2} + 2 \cdot x_{p3} \cdot x_{h3} - x_{h0}) + x_{p1}{}^2 + x_{p2}{}^2 + x_{p3}{}^2 - x_{p0} = 0 \quad (15)$$

Equation 15 is a quadratic equation of the form $a\alpha^2 + b\alpha + c = 0$ with a solution given by $$\alpha_{1/2} = \frac{-b \pm \sqrt{b^2 - 4ac}}{2a} \quad (16)$$

Some embodiments may implement the trilateration technique in other ways known in the art.

Figure 7:
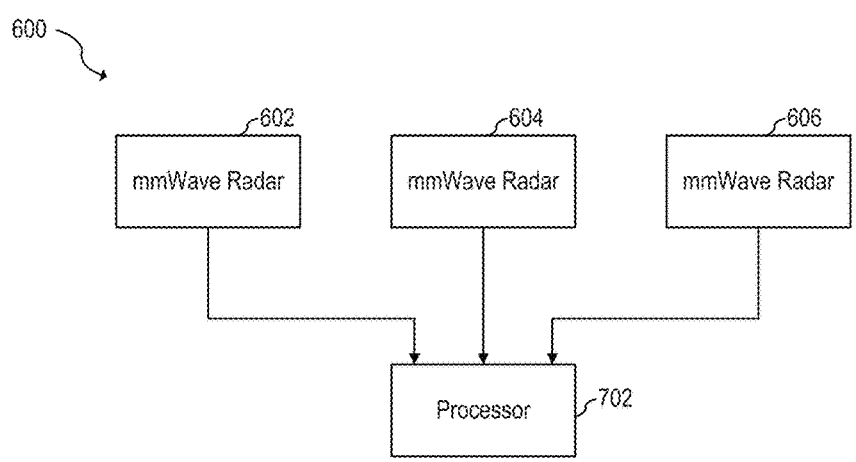

FIG. 7 shows a schematic diagram of network of millimeter-wave radars 600, according to an embodiment of the present invention. Each of millimeter-wave radars of network of millimeter-wave radars 600 may operate in an independent and non-coherent manner when monitoring an object in monitoring space 608.

As shown in FIG. 7, network of millimeter-wave radars 600 includes processor 702. Processor 702 receives the fine range estimate from each of millimeter-wave radars 602, 604, and 606, and determines the location of an object in monitoring space 608 by using trilateration. In some embodiments, processor 702 receives data from millimeter-wave radars 602, 604, and 606 wirelessly.

Processor 702 may be implemented as a general purpose processor, controller or digital signal processor (DSP) that includes, for example, combinatorial circuits coupled to a memory. In some embodiments, the DSP may be implemented with an ARM architecture, for example. In some embodiments, processor 702 may be implemented as a custom application specific integrated circuit (ASIC). In some embodiments, processor 702 includes a plurality of processors, each having one or more processing cores. In other embodiments, processor 702 includes a single processor having one or more processing cores. Other implementations are also possible. For example, some embodiments may be implemented as a combination of hardware accelerator and software running on a DSP or general purpose micro-controller. In some embodiments, processor 702 may be implemented together with a processor 104 of one of millimeter-wave radars 602, 604, or 606.

In some embodiments, processor 702 determines a plurality of locations of the object over time based on data received from millimeter-wave radars 602, 604, and 606, and uses a filter such as a Kalman filter or any other smoothing filter to generate a smooth trajectory of the object in monitoring space 608 over time in a two-dimensional (2D) plane.

A Kalman filter may be considered as an iterative process that uses a set of equations and consecutive data inputs to estimate position, velocity, etc., of an object when the data inputs (e.g., measured values) contain unpredicted or random error, uncertainty or variation. In an embodiment, a constant acceleration model is used for motion sensing and trajectory generation in a 2D plane. For example, the location, velocity, and acceleration of the object monitoring space 608 in a 2D plane may be given by vector $\underline{x}$ by $$\underline{x} = [x\, y\, \dot{x}\, \dot{y}\, \ddot{x}\, \ddot{y}] \quad (17)$$

and $$\underline{x} = A \underline{x}_k = \begin{bmatrix} 1 & 0 & \delta_t & 0 & \frac{1}{2}\delta_t^2 & 0 \\ 0 & 1 & 0 & \delta_t & 0 & \frac{1}{2}\delta_t^2 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} x_k \quad (18)$$

where $\underline{x}_k$ is the state of $\underline{x}$ at time k, and where $\delta_t$ is the time step.

The observation model that maps the state of the estimation with observed space may be given by $$\underline{y}_{k+1} = H x_k = \begin{bmatrix} 1 & 0 & 0 & 0 & 0 & 0 \\ 0 & 1 & 0 & 0 & 0 & 0 \end{bmatrix} x_k \quad (19)$$

and the 2D location $\underline{z}(x,y)$ may be estimated by network of millimeter-wave radars 600 using trilateration techniques. A processing noise may cause uncertainty in estimating the position of the sensed object through the state transition model of the Kalman filter. The processing noise may be modeled with process covariance matrix Q, which may be given by $$Q = G \cdot G^T \cdot \rho_a^2 \quad (20)$$

where $G = [0.5^2\ 0.5\delta_t^2\ \delta_t\ \delta_t\ 1\ 1]$ and $\rho_a^2$ is an acceleration process noise.

There may be noise in the estimated location estimated by trilateration. The noise may arise due to, e.g., thermal noise from the millimeter-wave radars 602, 604, and 606. The measurement noise due to noisy sensor measurements (e.g., noise associated with generating the fine range estimates) may be given by $$R = \begin{bmatrix} \delta x^2 & 0 \\ 0 & \delta y^2 \end{bmatrix} x_k \quad (21)$$

where R represents the measurement noise variance on each axis.

Figure 8:
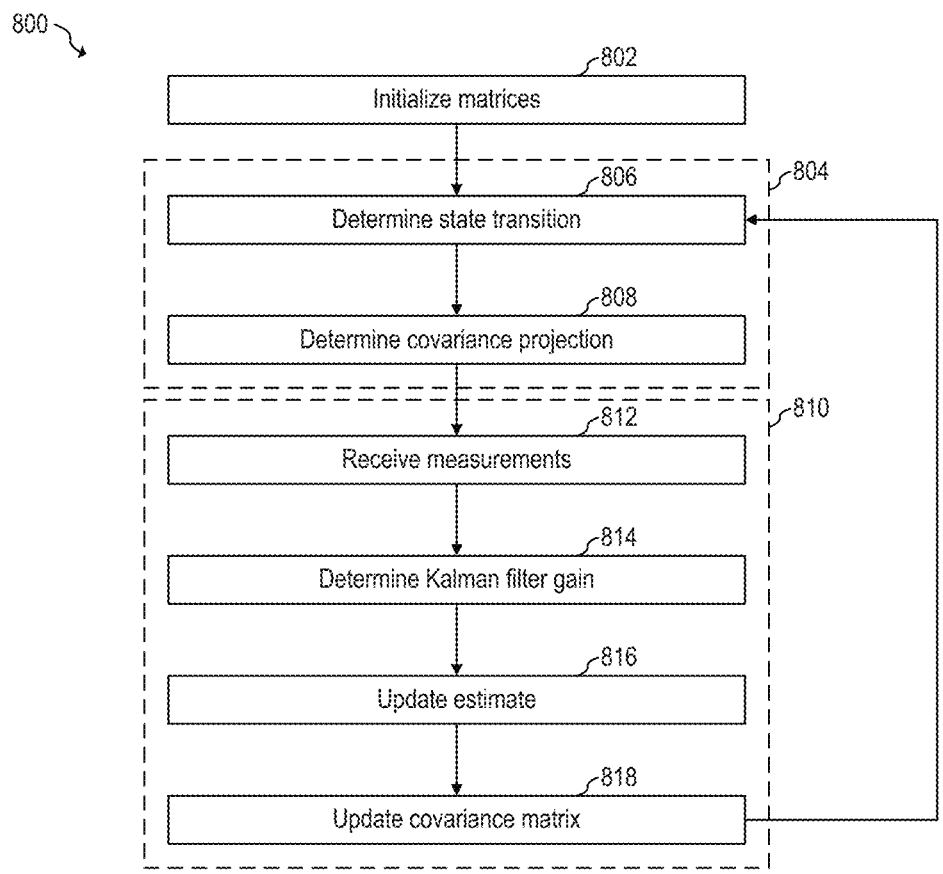
FIG. 8 shows a flowchart of an embodiment method of tracking a trajectory of an object in a monitoring space with a Kalman filter, according to an embodiment of the present invention.

FIG. 8 shows a flowchart of embodiment method 800 of tracking a trajectory of an object in monitoring space 608 with a Kalman filter, according to an embodiment of the present invention. Method 800 includes initialization step 802, prediction step 804, and correction/update step 810. Method 800 may be implemented, for example, by processor 702.

During step 802, the covariance matrices P, Q, and R, are initialized, where covariance matrix P corresponds to the covariance of the estimates of the location of the object, covariance matrix Q corresponds to the covariance of the processing noise, and covariance matrix R corresponds to the covariance of the measurement noise. In some embodiments, the initial values of matrices P, Q, and R are systematically determined based on, e.g., an experimental setup. In other embodiments, the initial values of matrices P, Q, and R are set to a predetermined default values, such as scaled identity matrices, or others.

During prediction step 804, a prediction of the location of the object is made based on the current state of the Kalman filter. Step 804 includes steps 806 and 808. During step 806, the state transition may be determined by $$\tilde{x}_{k+1} = A\underline{x}_k \quad (22)$$

During step 808, the covariance projection of the position may be determined by $$\tilde{P}_{k+1} = A\underline{P}_k A^T + Q \quad (23)$$

During correction/update step 810, the estimate of the location is updated based on the fine range estimates from network of millimeter-wave radars 600 and from the estimated location from step 804. Step 810 includes 812, 814, 816 and 818.

During step 812, fine range estimates zk of the position of the object are received from network of millimeter-wave radars 600. During step 814, the Kalman gain $K_k$ is determined based on covariance matrix $P_k$ and R, and may be given by $$K_k = \tilde{P}_{k+1} H^T (H\tilde{P}_{k+1} H^T + R)^{-1} \quad (24)$$

During step 816, the estimate $\underline{x}_k$ is updated based on fine range estimates $\underline{z}_k$ and the Kalman gain $K_k$. The estimate $\underline{x}_k$ may be given by $$\underline{x}_{k+1} = \tilde{x}_{k+1} + K_k(\underline{z}_k - H\tilde{x}_{k+1}) \quad (25)$$

During step 818, the covariance matrix Pk is updated, for example, by $$P_{k+1} = (1 - K_k H)\tilde{P}_{k+1} \quad (26)$$

After step 818, k is increased by one and the sequence is repeated, as shown in FIG. 8.

Some embodiments may implement the Kalman filter in other ways known in the art.

Using a Kalman filter advantageously allows for smoothing the trajectory of the object in the monitoring space.

In an embodiment of the present invention, a neural network, such as an LSTM neural network (e.g., an unidirectional or bidirectional LSTM), is trained, during a training phase, with a collection of gestures of an object (e.g., a metal marker, hand or finger) moving in monitoring space 608. During normal operation, the LSTM neural network is then used to associate (e.g., assign a label) the smoothened trajectories generated by the Kalman filter with character symbols, such as Latin characters, where the smoothened trajectories generated by the Kalman filter correspond to gestures performed by an object in monitoring space 608 during normal operation.

LSTM neural networks may be understood as recurrent networks that include a memory to model temporal dependencies. The activation of a neuron is fed back to itself with a weight and a unit time delay, which provides it with a memory (hidden value) of past activations, which allows it to learn the temporal dynamics of sequential data. Given a temporal input sequence $a^l = (a_1^l, \ldots, a_T^l)$ of length T, a recurrent neural network (RNN) may map it to a sequence of hidden values $h^l = (h_1^l, \ldots, h_T^l)$ and output a sequence of activations $a^{(l+1)} = (a_1^{(l+1)}, \ldots, a_T^{(l+1)})$ by iterating $$h_t^l = \rho(W_{xh}^l a_t^l + h_{t-1}^l W_{hh}^l + b_h^l) \quad (27)$$

where $\rho$ is the non-linear activation function, $b_h^l$ is the hidden bias vector and W terms denote weight matrices, $W_{xh}^l$ being the input-hidden weight matrix and $W_{hh}^l$ the hidden-hidden weight matrix. The activation for the recurrent units may be given by $$a_t^{l+1} = h_t^l W_{ha}^l + b_a^l \quad (28)$$

where $W_{ha}^l$ is the hidden-activation weight matrix and $b_a^l$ is the bias activation vector.

LSTMs extend RNN with memory cells by using gating. Gating may be understood as a mechanism based on component-wise multiplication of inputs that control the behavior of each individual memory cell of the LSTM. The LSTM updates its cell state according to an activation of the gates. The input provided to an LSTM is fed into different gates that control which operation is performed on the cell memory. The operations include write (input gate), read (output gate) and reset (forget gate). The vectorial representation (vectors denoting all units in a layer) of the update of an LSTM later may be given by $$\begin{cases} i_t = \sigma_i(W_{ai}a_t + W_{hi}h_{t-1} + W_{ci}c_{t-1} + b_i) \\ f_t = \sigma_f(W_{af}a_t + W_{hf}h_{t-1} + W_{cf}c_{t-1} + b_f) \\ c_t = f_t c_{t-1} + i_t \sigma_c(W_{ac}a_t + W_{hc}h_{t-1} + b_c) \\ o_t = \sigma_o(W_{ao}a_t + W_{ho}h_{t-1} + W_{co}c_t + b_o) \\ h_t = o_t \sigma_h(c_t) \end{cases} \quad (29)$$

where i, f, o and c are respectively the input gate, forget gate, output gate, and cell activation vectors, all of which may have the same size as vector h, which represents the hidden value. Terms a represent non-linear functions (e.g., a sigmoid function). The term $a_t$ is the input of the memory cell at time t and, in some embodiments, may be the location output at time k from the Kalman filter. $W_{ai}$, $W_{hi}$, $W_{ci}$, $W_{af}$, $W_{hf}$, $W_{cf}$, $W_{ac}$, $W_{hc}$, $W_{ho}$, and $W_{co}$ are weight matrices, where subscripts represent from-to relationships, and terms $b_i$, $b_f$, $b_c$, and $b_o$ are bias vectors.

The input weights may be the input states to the LSTM and are determined during the training phase. In some embodiments, the input weights of the LSTM are the Kaman filtered states of the variables x, y, ẋẏẍÿ of Equation 17. The loss function of the LSTM may be the loss determined at a single sequence step, which may be the average of log loss determined separately for each label, and may be given by $$\text{loss}(\hat{y}, y) = \frac{1}{|L|} \sum_{l=1}^{l=|L|} -(y_l \cdot \log(\hat{y}_l) + (1 - y_l) \cdot \log(1 - \hat{y}_l)) \quad (30)$$

where $\hat{y}$ is predicted class probability or label probability, y is the true class or label and L is the number possible classes or labels.

Figure 9:
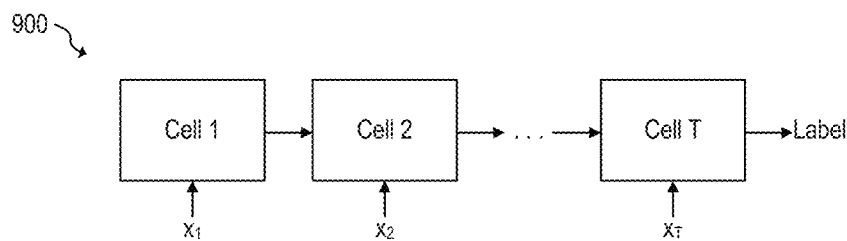
FIG. 9 shows a schematic diagram of an LSTM network, according to an embodiment of the present invention.

FIG. 9 shows a schematic diagram of LSTM network 900, according to an embodiment of the present invention. LSTM network 900 includes a plurality of cells (cell 1, cell 2, . . . , cell T).

As shown in FIG. 9, each cell cell, receives data $x_i$ (e.g., location coordinates at each frame of the target) from the output of the Kalman filter. For example, if the Kalman filter generates 100 locations estimates over time (where the 100 location estimates are associated with a trajectory of an object in monitoring space 608), then T is equal to 100 and each cell cell, receives a corresponding location estimate $x_i$.

LSTM network 900 then associates the trajectory received from the Kalman filter to a label, such as a Latin character symbol or numerical symbol.

Figure 10:
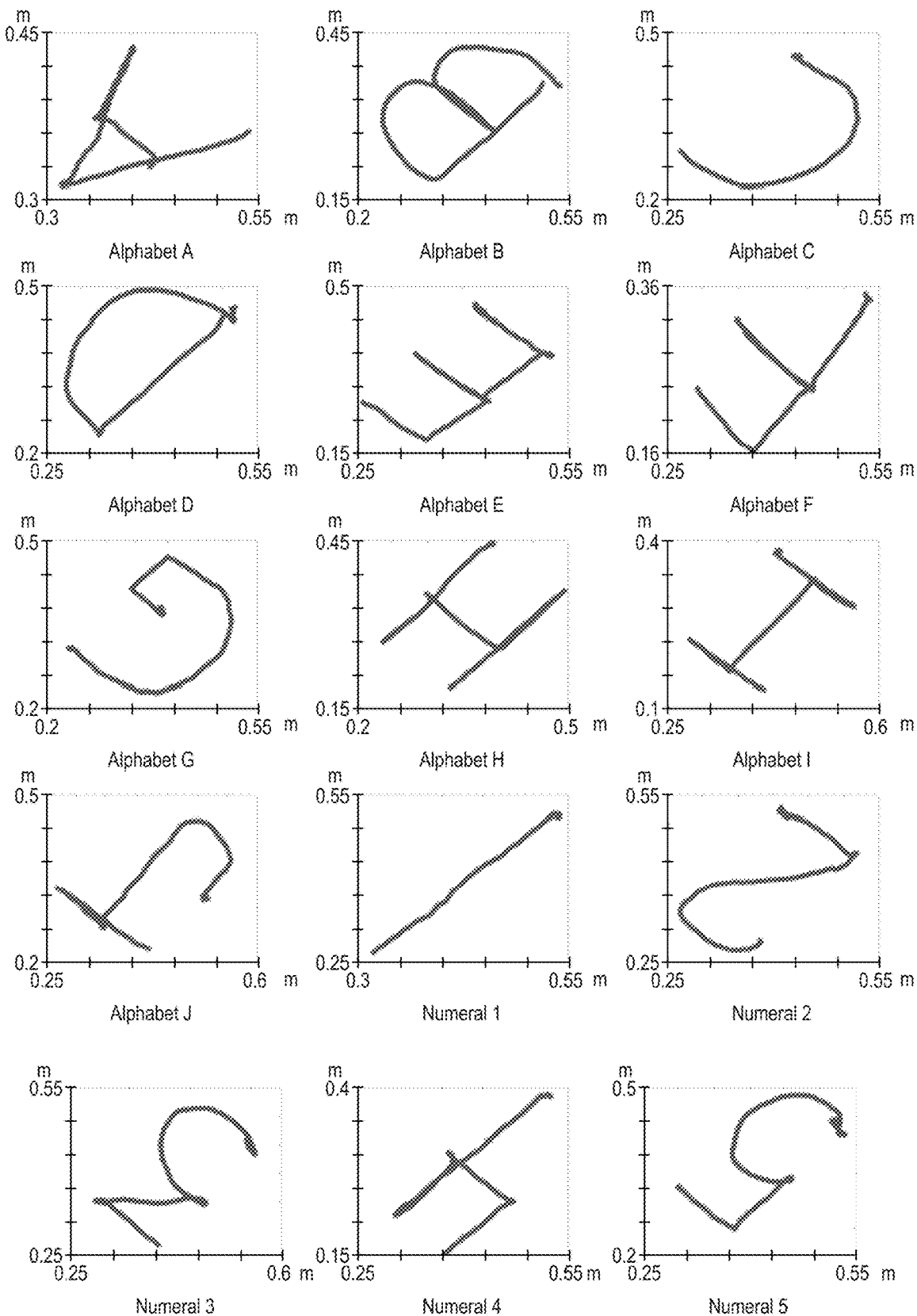
FIG. 10 illustrates trajectories of a metal marker in a monitoring space and the corresponding labels generated by an LSTM network, according to an embodiment of the present invention.

FIG. 10 illustrates trajectories of a metal marker in monitoring space 608 and the corresponding labels generated by LSTM network 900, according to an embodiment of the present invention. The x and y axes illustrate distances in meters with respect to origin (0,0). In some embodiments, the origin (0,0) corresponds to the location of one of the millimeter-wave radars (e.g., millimeter-wave radars 602). Other reference locations may also be used.

Although a metal marker was used to generate the trajectories illustrated in FIG. 10, other objects, such as finger of hand 114 may be used.

As shown in FIG. 10, monitoring space 608 may be located between 0.2 m and 0.6 m from one or more of the millimeter-wave radars. In some embodiments, a closest edge of monitoring space 608 may be closer to one or more of the millimeter-wave radars (e.g., 0.15 m or less), or further (such as 0.5 m or more). In some embodiments, a furthest edge of monitoring space 608 may be closer than 0.6 m (such as 0.5 m or less) or further than 0.6 m, such as 0.7 m or more).

In some embodiments, the trajectory of an object is a depiction of a character symbol, such as shown in FIG. 10. The neural network, such as LSTM network 900, maps such depiction to a character symbol. In other embodiments, an approximate depiction of a character symbol, a shorthand depiction of a character symbol, or an arbitrary gesture may be mapped to a character symbol. For example, in some embodiments, a trajectory of a straight line may be associated with the character symbol a, for example.

Some embodiments may implement the LSTM network in other ways known in the art.

Figure 11:
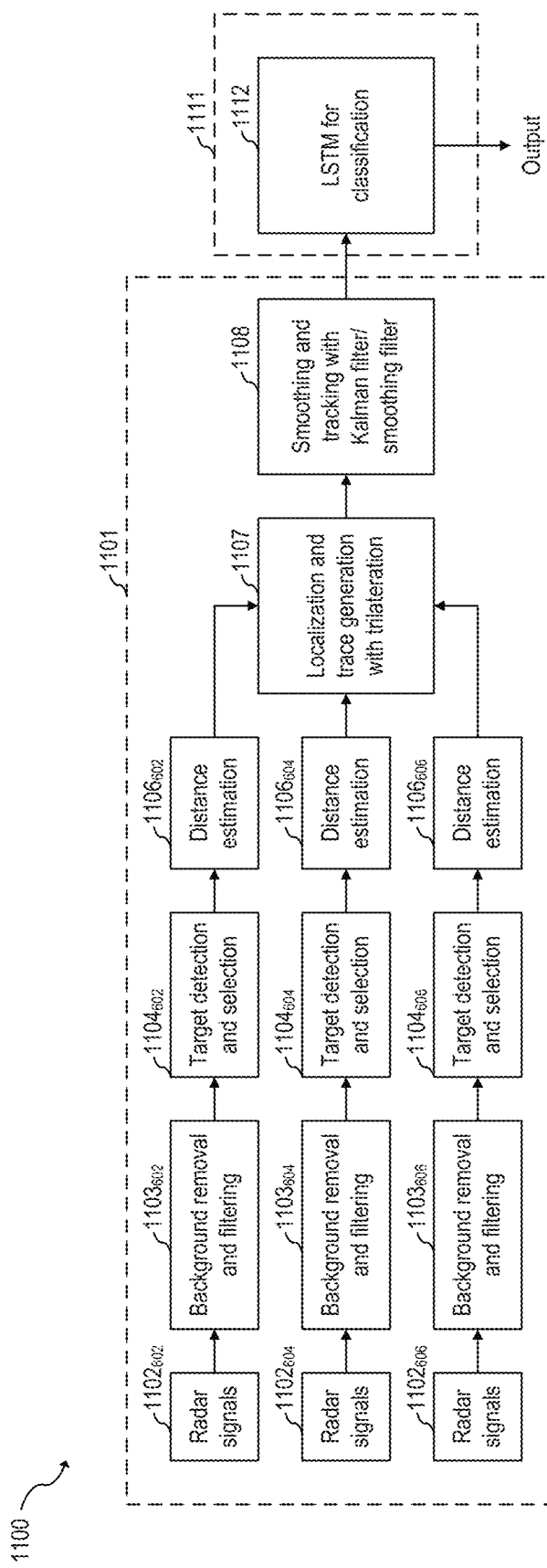
FIG. 11 shows a flowchart of an embodiment method for character recognition in air writing, according to an embodiment of the present invention.

FIG. 11 shows a flowchart of embodiment method 1100 for character recognition in air writing, according to an embodiment of the present invention. Method 1100 includes location extraction stage 1101 and recognition stage 1111.

During normal operation, millimeter-wave radars 602, 604 and 606 send and receive radar signals towards monitoring space 608 during steps $1102_{602}$, $1102_{604}$, and $1102_{606}$, respectively. The received radar signals may be filtered and digitized using, e.g., LPF 218 and ADC 220.

During step $1103_{602}$, $1106_{604}$, and $1103_{606}$, background removal and filtering is performed, e.g. by respective processors 104. For example, the digitized radar data generated during steps $1102_{602}$, $1102_{604}$, and $1102_{606}$, may be filtered, and DC components may be removed, e.g., to remove the transmitter-receiver self-interference and optionally pre-filtering the interference colored noise. In some embodiments, filtering includes removing data outliers that have significantly different values from other neighboring range-gate measurements. Thus, this filtering also serves to remove background noise from the radar data. In a specific example, a Hampel filter is applied with a sliding window at each range-gate to remove such outliers. Alternatively, other filtering for range preprocessing known in the art may be used.

When an object enters monitoring space 608, millimeter-wave radars 602, 604 and 606 detect the object during steps $1104_{602}$, $1104_{604}$, and $1104_{606}$, respectively, based on the radar signals received during steps $1102_{602}$, $1102_{604}$, and $1102_{606}$, respectively, and filtered during steps $1103_{602}$, $1106_{604}$, and $1103_{606}$, respectively. For example, in some embodiments, an object is detected by using range FFT on the radar data and detecting an object when a range bin is higher than a predetermined threshold. Other methods for object detection may also be used.

In some embodiments, not all detected objects are selected for tracking and further processing. For example, in some embodiments, the Doppler velocity of an detected object is determined. If the Doppler velocity is within a predetermined Doppler velocity range (e.g., a velocity range of a typical human hand movements), millimeter-wave radars 602, 604, and 606 may select such object for further processing. If the Doppler velocity is outside the predetermined Doppler velocity range, such as too slow (e.g., static) or too fast (e.g., 10 m/s), the object may be ignored and not selected for further processing. In some embodiments, other attributes, such as the size of the object detected, may be used, instead, or in addition to Doppler velocity to select an object for further processing.

During steps $1106_{602}$, $1106_{604}$, and $1106_{606}$, millimeter-wave radars 602, 604 and 606 respectively generate fine range estimates of the distance towards the detected and selected object (e.g., a tip of a finger of hand 114) using, e.g., method 300. During step 1107, processor 702 determines the location of the object in monitoring space 608 using trilateration, such as explained with respect to Equations 9 to 16. Processor 702 also generates traces of the determined location over time (e.g., by storing each determined location in local memory, for example).

During step 1108, processor 702 smoothens the trajectory (traces) generated during step 1107 and track the object over time, e.g., by using a Kalman filter, such as using method 800. In some embodiments, other smoothening filters may be used.

During step 1112, processor 702 associates the trajectory generated by the Kalman filter in step 1108 with a character symbol using an LSTM network, such as LSTM network 900, and generates an output (label) based on the association.

In some embodiments, the neural network used in step 1112 is implemented as an unidirectional or bidirectional LSTM network. In other embodiments, other types of neural networks may be used. For example, in some embodiments, a convolutional neural network (CNN) is used during step 1112 to generate an output (label) based on the trajectory generate by the Kalman filter in step 1108. For example, in some embodiments, a 2D image, similar to the images shown in FIG. 10, is generate during step 1108. A CNN then generates during step 1112 a label based on the 2D image generated in step 1108.

Figure 12:
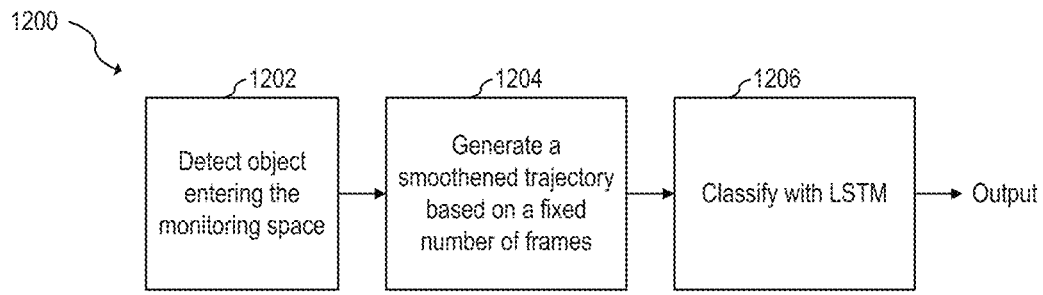
FIG. 12 shows a flowchart of an embodiment method for character recognition in air writing using framewise classification, according to an embodiment of the present invention.

In some embodiments, processor 702 determines the beginning and end of a trajectory based on fixed boundaries to generate a segment of trajectory. Processor 702 then feeds such segment of trajectory to LSTM network 900 for classification purposes. For example, FIG. 12 shows a flowchart of embodiment method 1200 for character recognition in air writing using framewise classification, according to an embodiment of the present invention.

During step 1202, network of millimeter-wave radars 600 detect an object, such as a tip of a finger of hand 114 entering monitoring space 608. During step 1204, a smoothened trajectory of the object in monitoring space 608 is generated for a fixed number of frames, such as 100 frames during 2 seconds. The smoothening trajectory may be obtained as described in step 1101 of FIG. 11, for example. A different number of frames, such as 128, 200, 96, 64, or other may be used. A different duration, such as 1.5 seconds, 2.5 seconds, or other may also be used.

During step 1206, the LSTM network receives the fixed number of frames and generates an output, as described with respect to step 1112 of FIG. 11, for example.

Figure 13:
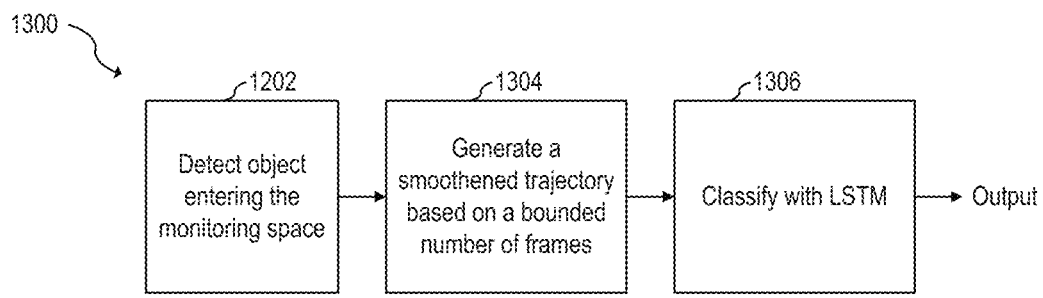
FIG. 13 shows a flowchart of an embodiment method for character recognition in air writing using framewise classification, according to an embodiment of the present invention.

FIG. 13 shows a flowchart of embodiment method 1300 for character recognition in air writing using framewise classification, according to an embodiment of the present invention.

During step 1304, a smoothened trajectory of the object in monitoring space 608 is generated for a bounded number of frames. The bound may be determined, for example, by detecting that the object exit monitoring space 608. The number of frames in such a bounded segment may be different for each trajectory.

During step 1306, the LSTM network receives the bounded number of frames and generates an output, as described with respect to step 1112 of FIG. 11, for example.

In some embodiments, processor 702 uses a connectionist temporal classification (CTC) layer to process unsegmented stream of data from the output of LSTM network 900, where the unsegmented stream of data is based on an unsegmented stream of location of the object over time. The output of LSTM network 900 is transformed into a conditional probability distribution over a label sequence. The total probability of any one label sequence may be found by summing the probabilities of different alignments. Processor 702 then segments the trajectory based on the output of the CTC layer and associates the segmented trajectory with a character symbol. The general operation of a CTC layer is known in the art.

Figure 14:
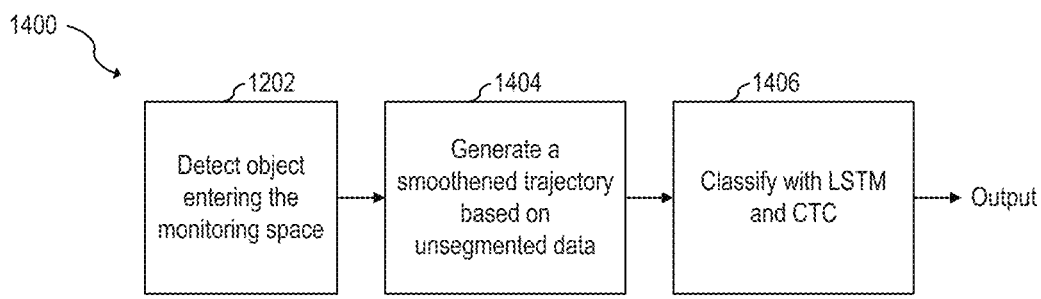
FIG. 14 shows a flowchart of an embodiment method for character recognition in air writing using CTC classification, according to an embodiment of the present invention.

FIG. 14 shows a flowchart of embodiment method 1400 for character recognition in air writing using CTC classification, according to an embodiment of the present invention.

During step 1404, a smoothened trajectory of the object in monitoring space 608 is generated continuously and is fed to an LSTM network with a CTC layer. During step 1406, the LSTM network with the CTC layer finds in real time the frame alignment with higher probability based on the possible LSTM labels (e.g., the set of possible character symbols plus a blank), segments the frame in accordance with such alignments and outputs the associated character symbol that corresponds with the segmented trajectory. In this way, processor 702 is advantageously capable of generating a continuous sequence of character symbols based on the trajectory of an object in monitoring space 608 without having to use predetermined time boundaries. By using an LSTM with CTC, processor 702 is advantageously capable of accurately associating character symbols with object trajectory irrespective of whether the object is moving fast or slow in monitoring space 608.

Some embodiments may implement the LSTM network with CTC in other ways known in the art.

It is understood that methods 1200, 1300, and 1400 may be combined in various ways. For example, in some embodiments, processor 702 may begin monitoring an object when the object enters monitoring space 608 and continuously generate character symbols using an LSTM with CTC for a predetermined number of frames (e.g., 500 or more) or until the object exits monitoring space 608.

Figure 15:
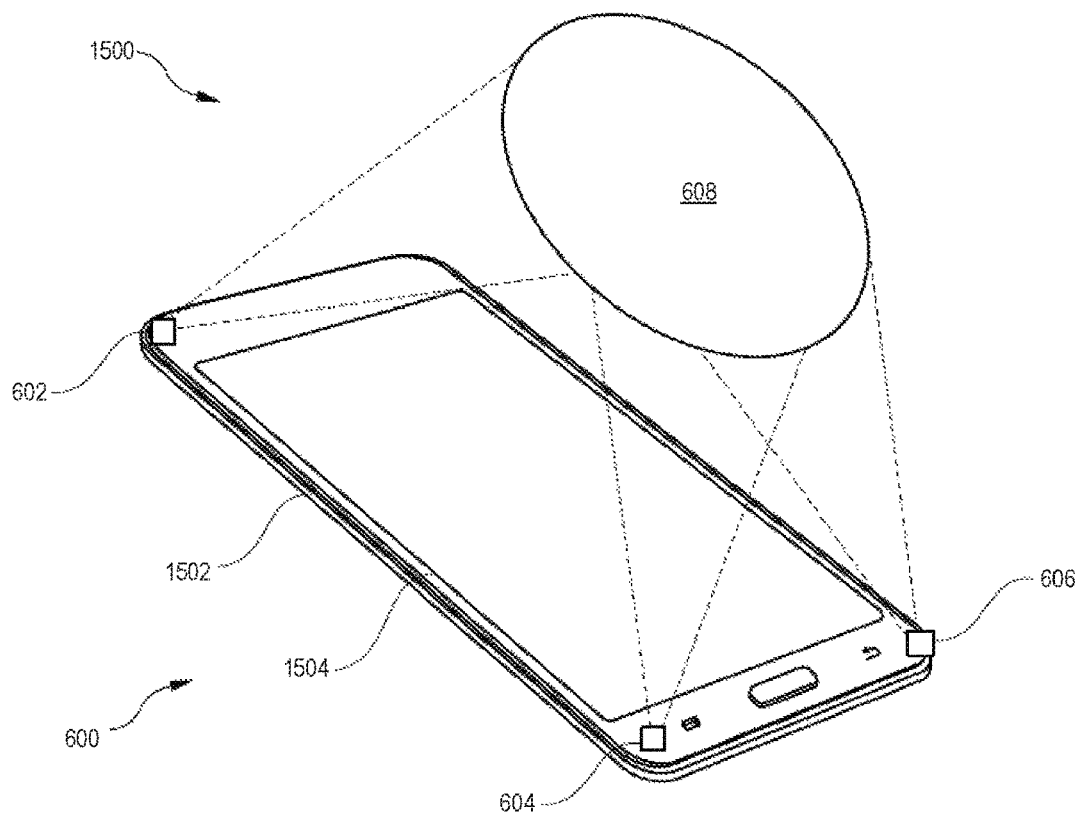
FIG. 15 shows a smartphone having the network of millimeter-wave radars of FIG. 6 for character recognition in air writing, according to an embodiment of the present invention.

FIG. 15 shows smartphone 1502 having network of millimeter-wave radars 600 for character recognition in air writing, according to an embodiment of the present invention. Network of millimeter-wave radars 600 may implement, e.g., any of methods 1100, 1200, 1300, and 1400 for character recognition in air writing.

As shown in FIG. 15, smartphone 1502 may have a millimeter-wave radar in three of the 4 corners of smartphone 1502. In some embodiments, smartphone 1502 may have more than three radars, such as four radars (e.g., one in each corner), or more. In some embodiments, the millimeter-wave radars may be located in other locations, such as in an edge of screen 1504.

In some embodiments, the outer edge of monitoring space 608 that is closest to screen 1504 is at 10 cm from screen 1504. In some embodiments, the distance between the outer edge of monitoring space 608 that is closest to screen 1504 and screen 1504 is smaller than 10 cm, such as 9 cm, 8 cm, or smaller. In some embodiments, the distance between the outer edge of monitoring space 608 that is closest to screen 1504 and screen 1504 is larger than 10 cm, such as 11 cm, 14 cm, or larger.

Screen 1504 may be, for example, a 5.2 inch screen. In some embodiments, smaller screens, such as 5.1 inch, 5 inch, 4.7 inch or smaller may be used. Larger screens, such as 5.3 inch, 5.5 inch or larger may be used.

In some embodiments, other devices, such as devices larger than smartphone 1502 may implement network of millimeter-wave radars 600 for character recognition in air writing. For example, in some embodiments, tablets, computer monitors, or TVs may implement network of millimeter-wave radars 600 in a similar manner as smartphone 1502. For example, FIG. 16 shows computer monitor 1602 having network of millimeter-wave radars 600 for character recognition in air writing, according to an embodiment of the present invention.

Figure 16:
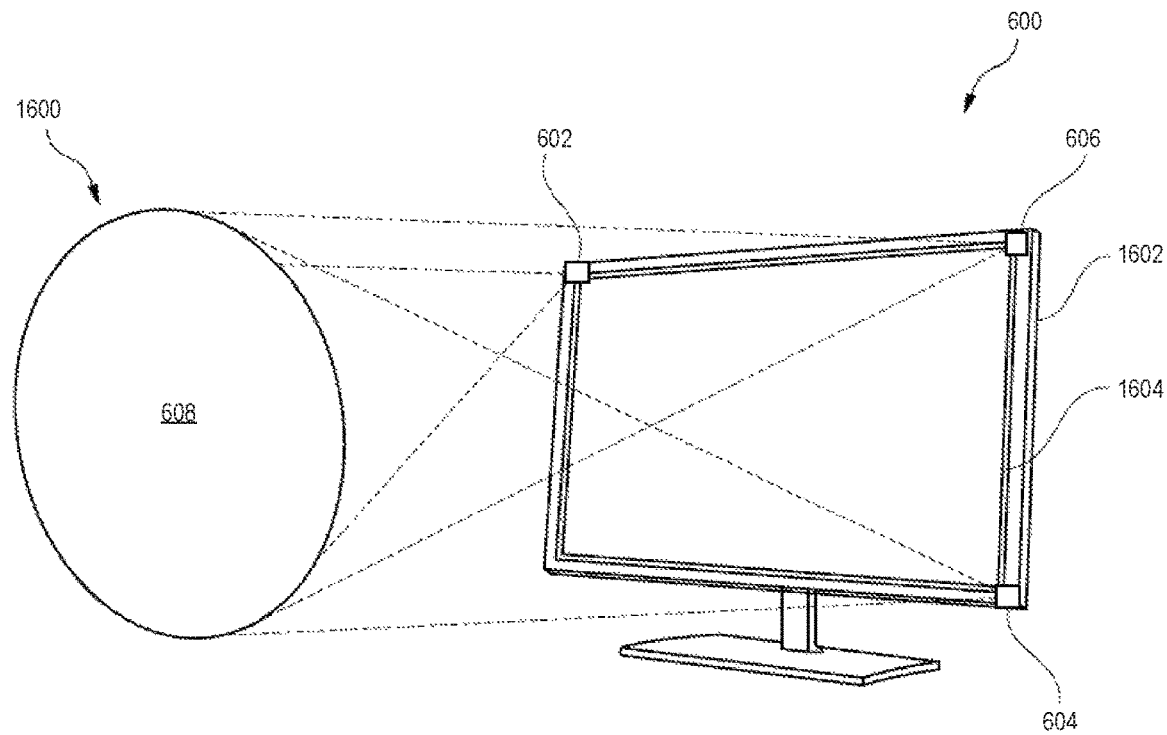
FIG. 16 shows a computer monitor having the network of millimeter-wave radars of FIG. 6 for character recognition in air writing, according to an embodiment of the present invention.

As shown in FIG. 16, computer monitor 1602 may have a millimeter-wave radar in three of the 4 corners of computer monitor 1602. In some embodiments, computer monitor 1602 may have more than three radars, such as four radars (e.g., one in each corner), or more. In some embodiments, the millimeter-wave radars may be located in other locations, such as in an edge of screen 1604.

In some embodiments, the outer edge of monitoring space 608 that is closest to screen 1604 is at 20 cm from screen 1504. In some embodiments, the distance between the outer edge of monitoring space 608 that is closest to screen 1204 and screen 1204 is smaller than 20 cm, such as 18 cm, 15 cm, or smaller. In some embodiments, the distance between the outer edge of monitoring space 608 that is closest to screen 1604 and screen 1604 is larger than 20 cm, such as 25 cm, 30 cm, or larger.

Screen 1604 may be, for example, a 27 inch screen. In some embodiments, smaller screens, such as 24 inch, 21 inch, 20 inch or smaller may be used. Larger screens, such as 34 inch, or larger may be used.

Example embodiments of the present invention are summarized here. Other embodiments can also be understood from the entirety of the specification and the claims filed herein.

Example 1

A method for air-writing character recognition, the method including: determining a position of an object in a monitoring space using trilateration by using a plurality of millimeter-wave radars, where each millimeter-wave radar of the plurality of millimeter-wave radars has a field of view, and where an intersection of the fields of view of the plurality of millimeter-wave radars forms the monitoring space; tracking the position of the object in the monitoring space over time using the plurality of millimeter-wave radars; determining a character symbol depicted by the tracked position of the object over time using a neural network (NN); and providing a signal based on the determined character symbol.

Example 2

The method of example 1, where determining the character symbol is based on the tracked position of the object over a predetermined fixed time.

Example 3

The method of one of examples 1 or 2, where determining the character symbol is based on the tracked position of the object over a bounded time.

Example 4

The method of one of examples 1 to 3, further including determining the bounded time based on detecting when the object enters and exits the monitoring space.

Example 5

The method of one of examples 1 to 4, where the NN includes a recurrent NN (RNN).

Example 6

The method of one of examples 1 to 5, where the RNN includes a long-short term memory (LSTM) network.

Example 7

The method of one of examples 1 to 6, further including: receiving an unsegmented stream of locations of the object over time; and using a connectionist temporal classification (CTC) to generate a sequence of character symbols based on the unsegmented stream of locations.

Example 8

The method of one of examples 1 to 7, where the NN includes a convolutional NN (CNN).

Example 9

The method of one of examples 1 to 8, where the character symbol includes a number or a Latin character.

Example 10

The method of one of examples 1 to 9, where tracking the position of the object includes: determining a trajectory of the object based on multiple determinations of the position of the object over time; and using a smoothening filter to smooth the determined trajectory.

Example 11

The method of one of examples 1 to 10, where the smoothening filter includes a Kalman filter.

Example 12

The method of one of examples 1 to 11, where the object includes a hand of a human.

Example 13

The method of one of examples 1 to 12, where the object includes a finger of a human.

Example 14

The method of one of examples 1 to 13, where the object includes a metallic object.

Example 15

The method of one of examples 1 to 14, where three millimeter-wave radars of the plurality of millimeter-wave radars are not situated in a straight line.

Example 16

The method of one of examples 1 to 15, where the monitoring space is located at a distance between 0.3 m and 0.6 m from each millimeter-wave radar of the plurality of millimeter-wave radars.

Example 17

The method of one of examples 1 to 16, further including: transmitting a chirp towards the monitoring space; receiving an echo of the chirp from the monitoring space; generating a beat signal based on the echo of the chirp; determining a beat frequency based on the beat signal; determining a first range based on the beat frequency; determining a beat signal phase based on the first range; generating a demodulated beat signal based on the determined beat frequency and the determined beat signal phase; determining a demodulated beat phase based on the demodulated beat signal; determining a demodulated beat range based on the demodulated beat phase; determining a fine range estimate based on the demodulated beat range; and determining the position of the object based on the fine range estimate.

Example 18

An air-writing character recognition system including: a plurality of millimeter-wave radars, where each millimeter-wave radar of the plurality of millimeter-wave radars is configured to have a field of view, and where an intersection of the fields of view of the plurality of millimeter-wave radars forms a monitoring space; and a controller configured to: determine a position of an object in the monitoring space based on outputs of the plurality of millimeter-wave radars by using trilateration, track the position of the object in the monitoring space over time based on the determined position using the plurality of millimeter-wave radars, determine a character symbol depicted by the tracked position of the object over time using a neural network (NN), and provide a signal based on the determined character symbol.

Example 19

The air-writing character recognition system of example 18, where determining the character symbol is based on the tracked position of the object over a bounded time.

Example 20

The air-writing character recognition system of one of examples 18 or 19, where the controller is further configured to: generate an unsegmented stream of locations of the object over time; and use a connectionist temporal classification (CTC) to generate a sequence of character symbols based on the unsegmented stream of locations.

Example 21

The air-writing character recognition system of one of examples 18 to 20, where the controller is configured to track the position of the object by using a Kalman filter.

Example 22

The air-writing character recognition system of one of examples 18 to 21, where the NN includes a long-short term memory (LSTM) network.

Example 23

A millimeter-wave radar system including: three millimeter-wave radars, each of the three millimeter-wave radars configured to have a field of view, where an intersection of the fields of view of each of the three millimeter-wave radars forms a monitoring space; and a controller configured to: determine a position of an object in the monitoring space based on output of the three millimeter-wave radars by using trilateration, determine a trajectory of the object over time based on the determined position of the object, apply a filter to the determined trajectory to generate a filtered trajectory, determine a character symbol depicted by the filtered trajectory using a long-short term memory (LSTM), and provide a signal based on the determined character symbol.

Example 24

A smartphone includes a millimeter-wave radar system and a screen. The millimeter-wave radar system includes: three millimeter-wave radars. Each of the millimeter-wave radars located at a corner of the smartphone. Each of the three millimeter-wave radars is configured to have a field of view, where an intersection of the fields of view of each of the three millimeter-wave radars forms a monitoring space. The smartphone further including a controller configured to: determine a position of an object in the monitoring space based on output of the three millimeter-wave radars by using trilateration, determine a trajectory of the object over time based on the determined position of the object, apply a filter to the determined trajectory to generate a filtered trajectory, determine a character symbol depicted by the filtered trajectory using a long-short term memory (LSTM), and provide a signal based on the determined character symbol.

Example 25

A computer monitor includes a millimeter-wave radar system and a screen. The millimeter-wave radar system includes: three millimeter-wave radars. Each of the millimeter-wave radars located at a corner of the smartphone. Each of the three millimeter-wave radars is configured to have a field of view, where an intersection of the fields of view of each of the three millimeter-wave radars forms a monitoring space. The smartphone further including a controller configured to: determine a position of an object in the monitoring space based on output of the three millimeter-wave radars by using trilateration, determine a trajectory of the object over time based on the determined position of the object, apply a filter to the determined trajectory to generate a filtered trajectory, determine a character symbol depicted by the filtered trajectory using a long-short term memory (LSTM), and provide a signal based on the determined character symbol.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for air-writing character recognition, the method comprising:
   determining a position of an object in a monitoring space using trilateration by using a plurality of millimeter-wave radars, wherein each millimeter-wave radar of the plurality of millimeter-wave radars has a field of view, and wherein an intersection of the fields of view of the plurality of millimeter-wave radars forms the monitoring space;
   tracking the position of the object in the monitoring space over time using the plurality of millimeter-wave radars;
   determining a character symbol depicted by the tracked position of the object over time using a neural network (NN); and
   providing a signal based on the determined character symbol.

2. The method of claim 1, wherein determining the character symbol is based on the tracked position of the object over a predetermined fixed time.

3. The method of claim 1, wherein determining the character symbol is based on the tracked position of the object over a bounded time.

4. The method of claim 3, further comprising determining the bounded time based on detecting when the object enters and exits the monitoring space.

5. The method of claim 1, wherein the NN comprises a recurrent NN (RNN).

6. The method of claim 5, wherein the RNN comprises a long-short term memory (LSTM) network.

7. The method of claim 6, further comprising:
   receiving an unsegmented stream of locations of the object over time; and
   using a connectionist temporal classification (CTC) to generate a sequence of character symbols based on the unsegmented stream of locations.

8. The method of claim 1, wherein the NN comprises a convolutional NN (CNN).

9. The method of claim 1, wherein the character symbol comprises a number or a Latin character.

10. The method of claim 1, wherein tracking the position of the object comprises:
    determining a trajectory of the object based on multiple determinations of the position of the object over time; and
    using a smoothening filter to smooth the determined trajectory.

11. The method of claim 10, wherein the smoothening filter comprises a Kalman filter.

12. The method of claim 1, wherein the object comprises a hand of a human.

13. The method of claim 1, wherein the object comprises a finger of a human.

14. The method of claim 1, wherein the object comprises a metallic object.

15. The method of claim 1, wherein three millimeter-wave radars of the plurality of millimeter-wave radars are not situated in a straight line.

16. The method of claim 1, wherein the monitoring space is located at a distance between 0.3 m and 0.6 m from each millimeter-wave radar of the plurality of millimeter-wave radars.

17. The method of claim 1, further comprising:
transmitting a chirp towards the monitoring space;
receiving an echo of the chirp from the monitoring space;
generating a beat signal based on the echo of the chirp;
determining a beat frequency based on the beat signal;
determining a first range based on the beat frequency;
determining a beat signal phase based on the first range;
generating a demodulated beat signal based on the determined beat frequency and the determined beat signal phase;
determining a demodulated beat phase based on the demodulated beat signal;
determining a demodulated beat range based on the demodulated beat phase;
determining a fine range estimate based on the demodulated beat range; and
determining the position of the object based on the fine range estimate.

18. An air-writing character recognition system comprising:
a plurality of millimeter-wave radars, wherein each millimeter-wave radar of the plurality of millimeter-wave radars is configured to have a field of view, and wherein an intersection of the fields of view of the plurality of millimeter-wave radars forms a monitoring space; and
a controller configured to:
determine a position of an object in the monitoring space based on outputs of the plurality of millimeter-wave radars by using trilateration,
track the position of the object in the monitoring space over time based on the determined position using the plurality of millimeter-wave radars,
determine a character symbol depicted by the tracked position of the object over time using a neural network (NN), and
provide a signal based on the determined character symbol.

19. The air-writing character recognition system of claim 18, wherein determining the character symbol is based on the tracked position of the object over a bounded time.

20. The air-writing character recognition system of claim 19, wherein the controller is further configured to:
generate an unsegmented stream of locations of the object over time; and
use a connectionist temporal classification (CTC) to generate a sequence of character symbols based on the unsegmented stream of locations.

21. The air-writing character recognition system of claim 19, wherein the controller is configured to track the position of the object by using a Kalman filter.

22. The air-writing character recognition system of claim 19, wherein the NN comprises a long-short term memory (LSTM) network.

23. A millimeter-wave radar system comprising:
three millimeter-wave radars, each of the three millimeter-wave radars configured to have a field of view, wherein an intersection of the fields of view of each of the three millimeter-wave radars forms a monitoring space; and
a controller configured to:
determine a position of an object in the monitoring space based on output of the three millimeter-wave radars by using trilateration,
determine a trajectory of the object over time based on the determined position of the object,
apply a filter to the determined trajectory to generate a filtered trajectory,
determine a character symbol depicted by the filtered trajectory using a long-short term memory (LSTM), and
provide a signal based on the determined character symbol.

* * * * *